Oct. 13, 1964     E. B. CLARK     3,153,118
ELECTRICAL FLOOR OUTLET
Filed Sept. 11, 1961
Fig. 1.
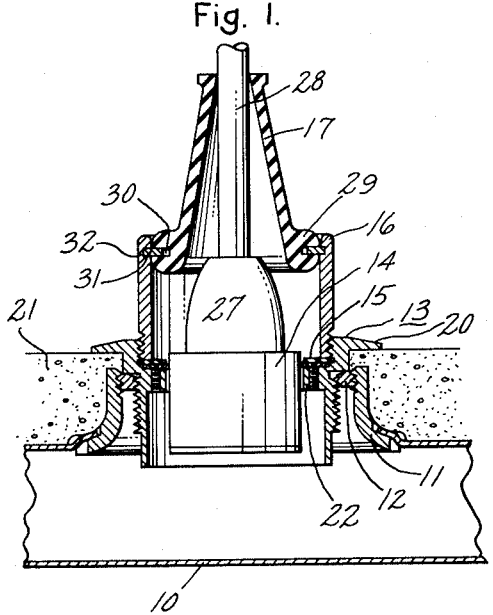
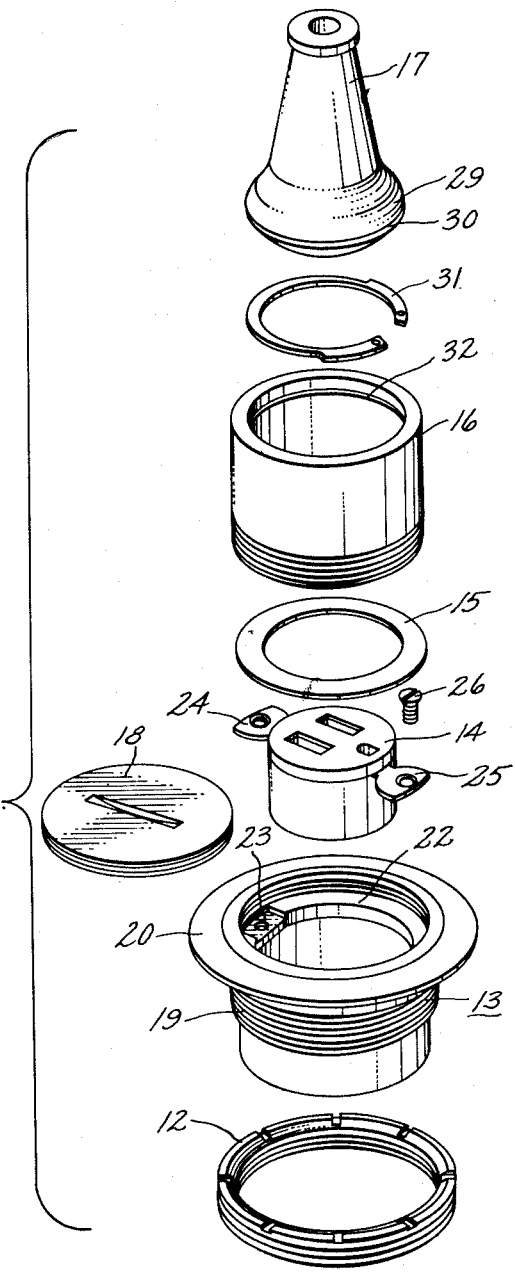
Fig. 2.
Inventor:
Edward B. Clark
by Allard A. Braddock
His Attorney United States Patent Office 3,153,118
Patented Oct. 13, 1964

3,153,118
ELECTRICAL FLOOR OUTLET
Edward B. Clark, Milford, Conn., assignor, by mesne assignments, to Jones and Laughlin Steel Corporation
Filed Sept. 11, 1961, Ser. No. 137,171
5 Claims. (Cl. 174—48)

This invention relates to an electrical floor outlet having means for protecting the plug and wiring to be installed within the outlet. More particularly, it relates to electrical floor outlets used in conjunction with underfloor electrical distribution systems.

In underfloor electrical distribution systems, it is common to provide more electrical access points than will be expected to be needed at a given time so that there will be a sufficient number of outlet openings in the desired places. When any of the openings are not being utilized, it is desirable that they be closed by abandoning plugs, and that these plugs fit within the same outlet openings. Also, it is desirable that any plug or wiring which is attached to the outlet is protected from damage or from being disconnected by kicks or by blows from objects being moved across the floor such as furniture, cleaning equipment, etc.

Accordingly, it is a primary object of the invention to provide an improved electrical floor outlet assembly.

It is a further object of the invention to provide an improved outlet assembly having means for protecting plugs to be installed within the outlet, and means for protecting the outlet from dirt and moisture.

Another object of the invention is to provide an improved electrical outlet assembly which can accommodate either plug protecting means or an abandoning plug.

Briefly stated, the invention relates to an electrical floor outlet assembly comprising a housing attached to a duct of an underfloor wiring distribution system and extending upwardly through an opening in the floor. The housing is provided with an outwardly extending flange that engages the upper surface of the floor surrounding the opening and an inwardly extending flange having a plurality of recesses within its upper surface. An electrical outlet adapted to be assembled within the housing is provided, and it has a plurality of outwardly extending lugs each of which fits within a respective one of the recesses in the surrounding flange when in the assembled relation. A gasket is positioned on the upper surfaces of the inwardly extending flange and the lugs, and a cylindrical kickpost, adapted to be removably secured within the top of the housing, seals the gasket against the upper surface. A resilient nozzle-shaped grommet or bushing is attached to the upper portion of the kickpost to provide a strain relief means.

Further features, objects, and advantages will become apparent with reference to the following drawing in which:

FIG. 1 shows a cross-sectional view of the floor outlet assembly of the invention as installed with an underfloor duct;

FIG. 2 is an exploded perspective view of the elements of the electrical floor outlet assembly of the invention.

Referring to FIG. 1, the outlet assembly is shown positioned on the upper wall of a duct 10, which represents a duct in an underfloor wire distribution system. Electrical wiring (not shown) is normally installed within the duct 10 to be in position to be secured to an electrical outlet of the type shown in FIG. 1. A tubular insert or riser 11 is positioned within an opening in the upper wall of the duct 10 and secured to the duct surface surrounding the opening, and the outlet assembly is positioned within the insert.

Briefly, and referring both to FIGS. 1 and 2 of the drawing, the assembly comprises an adapter 12, a housing 13, an outlet 14, a gasket 15, a kickpost 16, and a grommet or bushing 17. When the outlet 14 is not to be used, the kickpost 16 and grommet 17 may be replaced by an abandoning plug 18.

The adapter 12 is an annular member having threads on both its inner and outer cylindrical surfaces. It is threadably received within the upper portion of the riser insert 11 and positioned to receive the housing 13, which has a threaded exterior portion 19 to mate with the inner threads of the adapter 12. The housing 13 is formed with an outwardly extending flange 20 that is adapted to engage the upper surface of the floor 21 surrounding the opening. The threaded relationship between the insert, adapter, and housing provide a vertical adjustment so that the flange 20 may be drawn tightly into engagement with the surrounding floor. It will, of course, be recognized that the vertical adjustment feature could be provided without the use of the adapter 12 by providing sufficient threads on insert 11; however, it has been found that the arrangement shown is particularly suitable.

The housing 13 is also formed with an inwardly extending flange 22 formed with a pair of recesses within its upper surface, one of which is shown at 23. Outlet 14 is formed with a pair of outwardly extending lugs 24 and 25 which are adapted to be assembled within a respective one of the recesses when the outlet 14 is positioned within the housing 13. Suitable fastening means such as a pair of screws, one of which is shown at 26, are provided to secure outlet 14 to flange 22. A suitable gasket 15 may be positioned on the upper surface of flange 22 and over the lugs 24 and 25 so that when cylindrical kickpost 16 is threadably received within the top of the housing 13, the gasket 15 is pressed against the outlet lugs and the flange 22 to form a tight seal. The threads on the kickpost 16 adapt it to be removably secured within the top of housing 13 as desired. When the kickpost 16 is in position, an electrical plug 27 attached to cord 28, which is in turn connected to a piece of electrical equipment, may be inserted within the terminals of outlet 14. The kickpost protects the plug 27 from being kicked or otherwise damaged by being struck by heavy objects moved across the floor. Also, the kickpost 16 prevents the plug 27 from being disconnected from the outlet 14, and prevents dirt and water from entering the outlet.

To provide additional protection the cord 28 is provided with a bell or nozzle-shaped grommet or bushing 17, which is made of resilient material such as rubber or the like. The small upper end of the grommet 17 fits snugly around the cord 28, and the large lower end is formed with a thickened rim portion 29. The grommet 17 is adapted to be attached to the upper end of the housing 16 by any suitable fastening means. For example, the thickened portion 29 may be provided with a circumferential slot 30 adapted to receive snap ring 31. When the free ends of the snap ring 31 are drawn together, the ring may be inserted within the upper end of the housing 16; and when released, the snap ring expends into annular groove 32 in the upper end of kickpost 16. When assembled the grommet and kickpost provide an effective seal against dirt and moisture while at the same time preventing the plug from being damaged or dislodged. Also, the resiliency of the grommet 17 prevents the cord 28 from being cut or frayed.

If the plug 27 is to be removed, the grommet 17 may be separated from the housing 16 by removing the snap ring 31, or the kickpost 16 may be unthreaded from the housing 13. If the outlet 14 is not to be immediately re-used, the outlet should be closed to protect it from dirt and moisture. For this purpose, the abandoning plug 18 may be threadably inserted within the upper end of the housing 13. Similar to the kickpost 16, the abandoning plug 18 may be tightened against the gasket 15 to provide a good seal. With the plug 18 in position, the outlet assembly is essentially flush with the floor 21 so that the assembly is relatively unobtrusive.

Thus, it will be appreciated that a convenient and rugged electrical floor outlet assembly has been shown and described. The relatively few number of parts to the assembly and the ease of installation including the alternate closures of the plug 18 or the kickpost 16 carrying the grommet 17 make the assembly particularly desirable.

It will be obvious to those skilled in the art that various changes and modifications may be made without departing from the invention in its broader aspects. Accordingly, it is intended in the appended claims to cover all such changes and modifications as fall within the true spirit and scope of the invention.

What I claim as new and desire to secure by Letters Patent of the United States is:

1. An electrical floor outlet assembly comprising a housing attached to a duct of an underfloor wire distribution system and extending upwardly within an opening in the floor, said housing having an outwardly extending flange adapted to engage the upper surface of the floor surrounding the opening and disposed substantially flush thereto, said housing having an inwardly extending flange having a plurality of resses within its upper surface, an electrical outlet adapted to be assembled within said housing and having a plurality of outwardly extending lugs each of which fits within a respective one of the recesses in the assembled relation, a gasket positioned on the upper surface of said inwardly extending flange and said lugs, a cylindrical kickpost adapted to be removably secured within the top of said housing abutting said gasket, and a resilient nozzle-shaped grommet attached to the upper portion of said kickpost.

2. The assembly of claim 1 including an abandoning plug adapted to be removably secured within the top of said housing abutting said gasket when said kickpost is not secured therein.

3. An electrical floor outlet assembly comprising a tubular insert attached to a duct of an underfloor wire distribution system and extending upwardly within an opening in the floor, a housing threadably inserted within said insert, said housing having an outwardly extending flange that engages the upper surface of the floor surrounding the opening and disposed substantially flush thereto, said housing having an inwardly extending flange having a plurality of recesses within its upper surface, an electrical outlet adapted to be assembled within said housing and having a plurality of outwardly extending lugs each of which fits within a respective one of the recesses in the asesembled relation, a gasket positioned on the upper surface of said inwardly extending flange and said lugs, a cylindrical kickpost adapted to be removably secured within the top of said housing abutting said gasket, and a resilient nozzle-shaped grommet attached to the upper portion of said kickpost.

4. An electrical floor outlet assembly comprising a tubular insert for attachment to a duct of an underfloor wire distribution system to extend upwardly within an opening in the floor, an adapter threadably secured within the insert, a housing threadably inserted within said adapter, said housing having an outwardly extending flange that engages the upper surface of the floor surrounding the opening and disposed substantially flush thereto, said housing having an inwardly extending flange having a plurality of recesses within its upper surface, an electrical outlet adapted to be assembled within said housing and having a plurality of outwardly extending lugs each of which fits within a respective one of the recesses in the assembled relation, a gasket positioned on the upper surface of said inwardly extending flange and said lugs, a cylindrical kickpost adapted to be movably secured within the top of said housing abutting said gasket, and a resilient nozzle-shaped grommet attached to the upper portion of said kickpost.

5. The assembly of claim 4 including an abandoning plug adapted to be removably secured within the top of said housing abutting said gasket when said kickpost is not secured therein.

References Cited in the file of this patent
UNITED STATES PATENTS

| | | |
|---|---|---|
| 1,693,682 | Walker | Dec. 4, 1928 |
| 1,921,162 | Kennedy | Aug. 8, 1933 |
| 1,977,891 | Olley | Oct. 23, 1934 |
| 2,721,983 | Blinn | Oct. 25, 1955 |
| 2,738,892 | Wiesmann | Mar. 20, 1956 |
| 3,027,416 | Kissel | Mar. 27, 1962 |